United States Patent Office 3,486,456
Patented Dec. 30, 1969

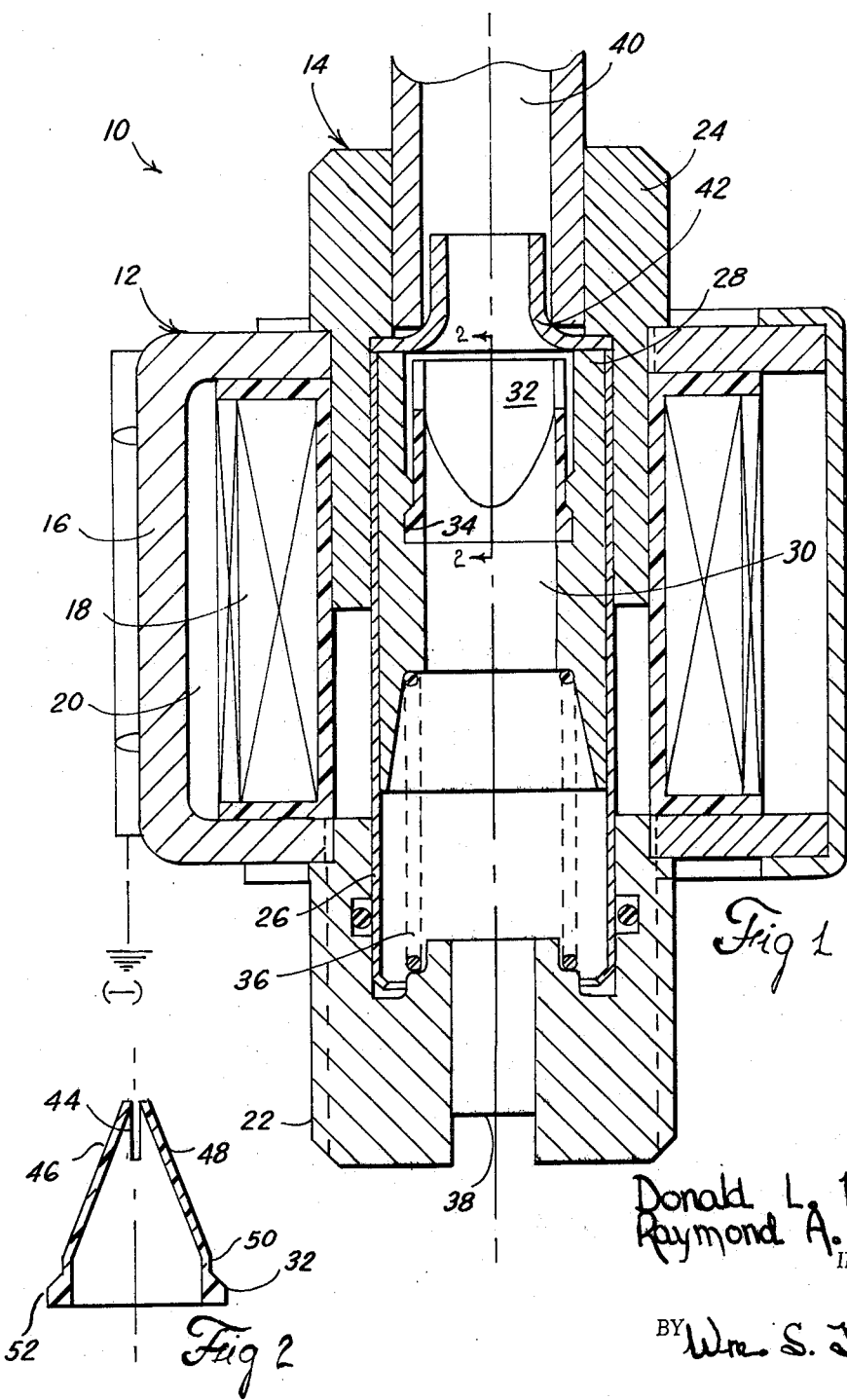

3,486,456
VALVING FOR ELECTROMAGNETIC PUMP
Donald L. Hager and Raymond A. Gantert, Elmira, N.Y., assignors to The Bendix Corporation, a corporation of Delaware
Filed Mar. 14, 1968, Ser. No. 713,253
Int. Cl. F04b 17/00; H02n 4/20; F16k 15/14
U.S. Cl. 103—53       4 Claims

ABSTRACT OF THE DISCLOSURE

An electromagnetic plunger pump having a one-piece pliable plunger valve. The valve resembles, both in shape and operation, the bill of a duck. The upper and lower portions of the duck bill move away from each other as the plunger is drawn into its cocked position and are forced together during the pumping action. In order to provide a rapid opening and closing action, the inlet and outlet orifices are reduced in size, thus providing rapid pressure changes.

BRIEF SUMMARY OF INVENTION

As the use of electromagnetic plunger pumps to pump fuel has increased in the land vehicle field, it has become more important to increase their delivery and general performance characteristics. To improve delivery, rapid closing spring-loaded check valves have been used. This has produced a side result which is highly undesirable in the automotive application. As pump plunger speeds increase and valve closing times decrease, the pumps have shown the objectionable tendency to generate large volumes of noise. This noise is produced by the sonic hammer effect in the fuel tank caused by shock waves generated by the valve in the plunger of the pump. It is, therefore, an object of this invention to provide a valve for an electromagnetic pump plunger which does not generate, nor cause to be generated, a sonic hammer in the fluid being pumped.

As the use of motorized land vehicles spreads to geographic areas having predictable extremes in weather, it has become increasingly more important to provide a fuel pump for these vehicles which will have a sufficient delivery at extreme low temperatures to satisfactorily supply fuel to the engine of the vehicle. It is, therefore, an object to provide an electromagnetic plunger pump capable of operating and pumping fluid in climates having extremely-low temperatures. It is a further object of this invention to provide such a pump which is also functional in conventional climates.

Known duck bill profiled valves are not capable of efficient cold temperature operation because, in opening, it is required that the valve material at the opening execute a complex motion by changing from a closed slit to an open oval. This requires flexing of the material in at least one direction and stretching of the material in a second direction. This complex motion is greatly impeded at extreme cold, since valve materials which will freely execute one motion, will not freely execute the other. It, therefore, becomes an object of this invention to provide a valve for the plunger of an electromagnetic pump which is efficient in operation at extremes of temperature and which executes substantially only one form of motion in an operating mode.

Since vehicle repair in hostile climate conditions is highly difficult, it is another object of this invention to provide an electromagnetic pump plunger valve which is fabricated in one piece so as to be resistant to frictional wear.

Other and further objects and advantages will become apparent from the appended drawing and claims and the detailed description which follows.

BRIEF DESCRIPTION OF THE DRAWING

FIGURE 1 shows an electromagnetic plunger pump made according to the present invention.

FIGURE 2 shows the plunger valve, taken along line 2—2 in FIGURE 1, used in the pump according to the present invention.

DETAILED DESCRIPTION

Referring now to FIGURE 1, an electromagnetic pump, designated generally by 10, is shown. This pump is explained in greater detail in the commonly-assigned co-pending application Ser. No. 621,809. However, for the purpose of this invention, we shall consider the pump as having a coil cannister body 12 generally and a central member 14 generally. The coil cannister body 12 includes a body 16 of electromagnetic flux conducting material, and an electromagnetic coil 18 disposed in a cavity 20. The coil cannister body 12 also includes all of the necessary electrical switching apparatus and leads which, for simplicity, are not shown, but which are fully described and explained in the above-noted application.

The central member 14 consists of an inlet body 22, an outlet body 24, and an interconnecting central conduit 26 which provides a fluid-tight bearing surface within which the plunger 28 may reciprocatorily move. The plunger 28 has an axially-extending bore 30 and carries a duck-billed valve 32 in a groove 34 at one end of the bore 30. The plunger is biased toward a first or relaxed position by spring 36. Upon energization of the coil, the plunger 28 is drawn into a second or cocked position which compresses the spring 36.

The inlet body 22 has a passage therethrough 38 which is substantially smaller in cross-sectional area than the bore through the plunger 30 and which may also include a check valve, not shown. The outlet body 24 has a passage therethrough 40 and includes a restriction in the form of an outlet fitting 42 which has a passage or port which, like the passage through the inlet body 22, is substantially smaller in cross-sectional area than the bore through the plunger 30.

FIGURE 2 shows the valve 32, taken along the line 2—2 in FIGURE 1. As can be seen in this view, the valve 32 resembles the bill of a duck in profile. It also opens and closes as does the bill of a duck due to the slit 44 in the axially-extending portion of the valve. This is actually a pair of radially-opposed slits which lie in a plane which includes the center line of the valve.

The slits 44 serve to separate a pair of converging planar surfaces 46 and 48 so that the planar surfaces need only to flux to provide an opening for the passage of fluid. The valve 32 has a cylindrical portion 50 which is substantially axial in extent. At one end of the cylindrical portion 50 is a shoulder 52 which conforms to the groove 34 in the plunger 28 and is for purposes of mounting the valve 32 in the plunger 28. The other end of the cylindrical portion 50 is truncated by a pair of converging planar surfaces 46 and 48. This pair of surfaces is so arranged that if extended to their line of convergence, this would form a line segment perpendicular to the axial center line of the cylindrical portion 50. These mutually-perpendicular lines also define a plane which includes the slits 44 and may be thought of as a plane of symmetry. That is, the portion of the valve 32 above the plane is symmetrical with that portion of the valve 32 below the plane.

In operation, the initial flow of current will draw the plunger 28 down with respect to FIGURE 1 of the drawing. This is the cocking motion and during this downward travel of the plunger 28, the duck bill 32 will spread, allowing liquid to pass through the bore 30 of the pump plunger and through the valve to fill the space above the plunger. The opening motion of the valve 32 is facilitated by the pressure built up immediately below the valve 32, due to the incompressibility of liquids and the fact that the reduced bore 38 of the inlet body presents a restriction which inhibits the tendency of the liquid to flow back out of the bore 38, due to the downward motion of the plunger 28.

When the plunger 28 reaches its extreme rearward position, the current to the coil is switched off in the conventional manner, and the spring 36 begins to advance the plunger to its normal at-rest position. In the first instant of upward piston travel, the cross-section area of the bore of the outlet fitting 42, being substantially smaller than the cross-sectional area of the plunger 30, pressure is rapidly built up in the fluid which is contained within the conduit 26 between the outlet fitting 42 and the plunger 30. This pressure; acting equally on all exposed surfaces, including the large flat surfaces of the duck bill valve 32, forces the valve rapidly and abruptly to close.

It should be noted that motion of the plunger 28 in either direction produces an increase in the pressure of the fluid in the direction of the motion, due to the cross-sectional area differences between th plunger 28 and the inlet restriction passage and a decrease in the pressure of the fluid on the other side of the plunger. This produces a pressure gradient across the valve 32 which, depending on the direction of the gradient, will forcibly open or close the valve 32.

Because the valve is an energy absorbing design when the pressure is developed in the fluid by the plunger motion, there is no resultant sonic hammer. The valve flexes and removes the abrupt shut-off feature common to other valves which are aided in closing by pressure build up in the pump. The fact that the two resilient surfaces are coming together is also beneficial in reducing sonic hammer, since the initial shock of contact is absorbed to some extent by the valve material.

We claim:
1. An electromagnetic plunger pump comprising:
   a coil body means;
   electromagnetic coil means contained within said body;
   an inlet means;
   an outlet means;
   an interconnecting conduit means;
   said inlet means, outlet means and interconnecting conduit means forming a pump body having a passage therethrough and said electromagnetic coil means in a surrounding relation thereto;
   a plunger means slidably retained within said interconnecting conduit means and having a bore therethrough defining an axial direction;
   a resilient valve received in the bore of said plunger means and operative to open and pass fluid when said plunger is moved in a substantially-axial first direction, and is further operative to close and prevent fluid passage when the plunger is moved in a substantially-axial second direction which is in opposition to said first direction;
   said valve having an axially-extending cylindrical portion which terminates in a pair of converging plane surfaces located on either side of the axial center line of said valve and which converge to a straight line segment, said line segment being perpendicular to said axial center line;
   said line segment and said axial center line forming a cutting plane which defines slits cut in said valve for a substantial portion of the axial extension of said valve; and
   orifice restriction means to cause rapid pressure increases inside said interconnecting conduit in response to movement of said plunger and operative to force said flat surfaces toward and away from each other.

2. The plunger pump as claimed in claim 1 wherein said orifice restriction means include orifice fittings having passages therethrough which are substantially smaller than the bore through said plunger.

3. The plunger pump as claimed in claim 1 wherein said orifice restriction means are located in said outlet means.

4. The plunger pump as claimed in claim 1 wherein said orifice restriction means are located in said inlet and said outlet means.

References Cited
UNITED STATES PATENTS 2,524,764  10/1950  Burke _____ 137—525.1 XR
3,116,695  1/1964  Faller _____ 103—53

ROBERT M. WALKER, Primary Examiner

U.S. Cl. X.R.
137—525.1